Figure 1:
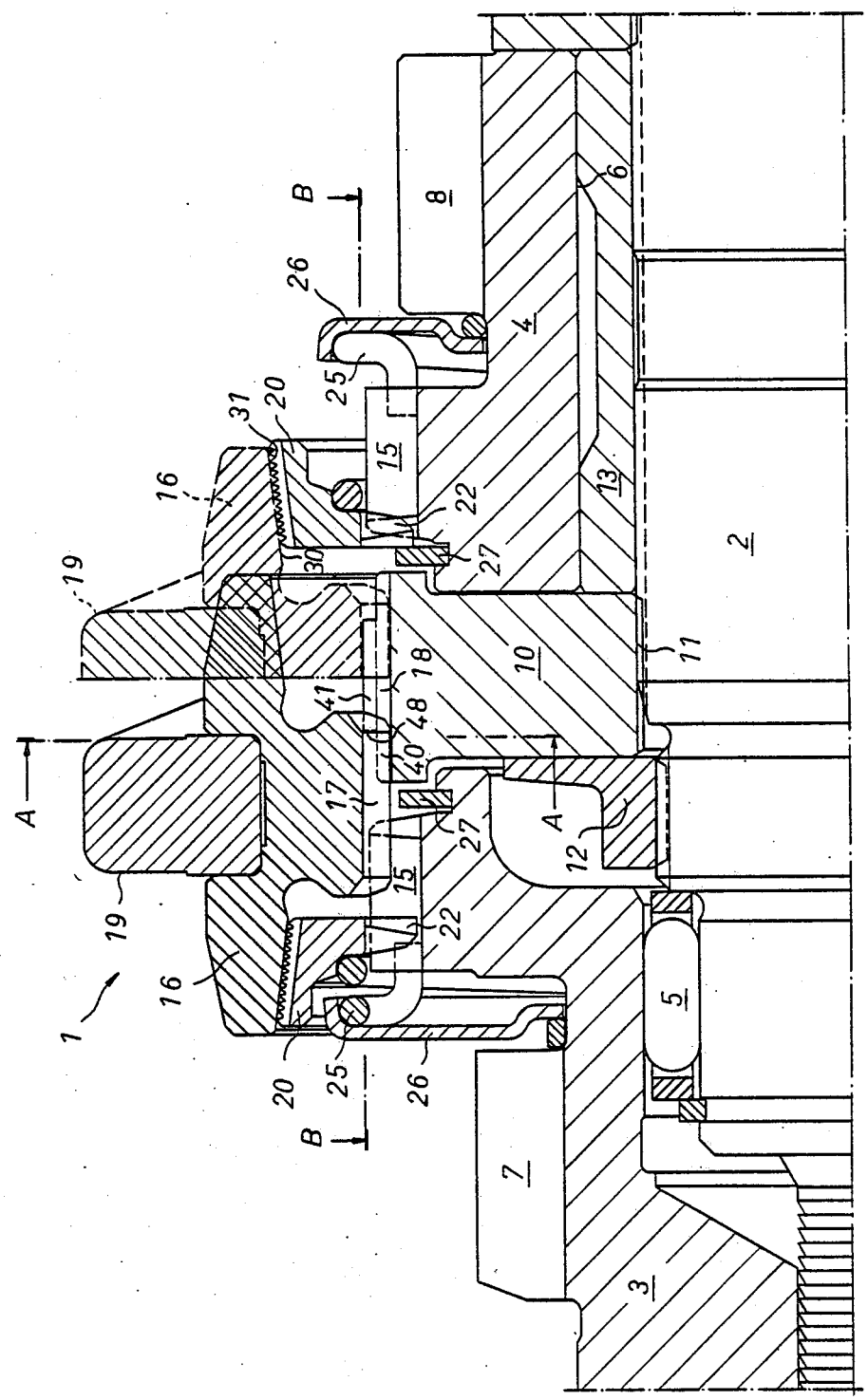

United States Patent [19]

Johnsson

[11] 4,270,639
[45] Jun. 2, 1981

[54] SYNCHRONIZING ARRANGEMENT FOR A MOTOR VEHICLE GEAR BOX

[75] Inventor: Tage R. W. Johnsson, Goteborg, Sweden

[73] Assignee: Saab-Scania AB, Södertälje, Sweden

[21] Appl. No.: 958,865

[22] Filed: Nov. 8, 1978

[30] Foreign Application Priority Data

Nov. 11, 1977 [SE] Sweden ............................ 7712765

[51] Int. Cl.³ ............................................. F16D 23/06
[52] U.S. Cl. ................................ 192/53 F; 192/53 G; 192/114 T
[58] Field of Search ................ 192/53 F, 53 G, 114 T

[56] References Cited

U.S. PATENT DOCUMENTS

| | | | |
|---|---|---|---|
| 2,846,038 | 8/1958 | Brownyer | 192/114 T X |
| 3,219,164 | 11/1965 | Henyon | 192/114 T |
| 3,305,061 | 2/1967 | Duncan | 192/53 G X |
| 3,737,016 | 6/1953 | Worner | 192/53 F |
| 4,050,558 | 9/1977 | Muller | 192/114 T X |

FOREIGN PATENT DOCUMENTS 1220115  1/1960  France .

*Primary Examiner*—Allan D. Herrmann
*Attorney, Agent, or Firm*—Strimbeck, Davis & Soloway

[57] ABSTRACT

The invention relates to a synchronizing arrangement for a motor vehicle gear box, comprising at least one synchronizing hub disposed locationally fixed in the longitudinal direction on a shaft, which hub co-acts via external teeth with internal teeth on a concentric synchronizing sleeve which is arranged so that it may be displaced in the axial direction.

The invention is characterized in that the hub is formed with teeth which have a different tooth shaping in a lower and in an upper part of the tooth respectively, in that the tooth shaping in the upper tooth part is wider than an extension of the tooth shaping in the lower tooth part up to the maximum diameter of the hub, in that the tooth shaping in the upper parts of the teeth is able to fit into the grooves between the teeth on the sleeve, in that the lower parts of the teeth have a greater axial length than the upper parts of the teeth, and in that the teeth on the sleeve co-act, when torque is transmitted, with the lower parts of the teeth on the hub, so that a tooth flank in the upper part of the teeth occupies a position outside the profile of the tooth grooves on the sleeve and thereby prevents the axial displacement of the sleeve into engagement with the upper tooth parts on the hub.

The arrangement of the invention enables the synchronizing hub and sleeve to be manufactured relatively simply and cheaply.

8 Claims, 3 Drawing Figures

SYNCHRONIZING ARRANGEMENT FOR A MOTOR VEHICLE GEAR BOX

The present invention relates to a synchronising arrangement for motor vehicle gear boxes, comprising at least one synchronising hub disposed locationally fixed in the longitudinal direction on a shaft, which hub coacts via external teeth with internal teeth on a concentric synchronising sleeve which is arranged so that it may be displaced in the axial direction.

For this kind of synchronising arrangement it is already known to construct some of the teeth on the synchronising hub with a wider tooth shape and shorter axial length than the other teeth. The latter are constantly engaged with the internal teeth on the synchronising sleeve while the shorter teeth are disconnected from engagement with the sleeve at the end of an axial movement by the sleeve from a neutral position to a lateral position. The sleeve is designed so that in a lateral position it engages via its internal teeth with the external teeth of a wheel mounted concentric with the axle; thereby the sleeve forms a connecting element for transmitting torque between the wheel and the hub. In such an engaged lateral position, the internal teeth on the sleeve are caused, during transmission of torque, to rest on the flanks of the teeth on the hub which are axially longer, and the synchronising sleeve is forced in the axial direction by a spring effect so that the end faces of the teeth on the synchronising sleeve rest on the end faces of the short, wide teeth on the synchronising hub; thereby movement of the synchronising sleeve relative to the synchronising hub is prevented in the axial direction. This prevents an engaged gear from being unintentionally disengaged during the transmission of torque.

However, from the manufacturing point of view, the hub and the sleeve in this known arrangement involve expensive contouring, since different tooth widths require complicated and time-consuming machining operations. Dissimilar lengths for the teeth on the hub further entails separate milling operations which require the use of a dividing head. Obviously, this kind of milling operation is also time-consuming and the manufacture of a hub of this kind is therefore very expensive.

An object of the present invention is to eliminate or at least substantially reduce the above disadvantages and to provide an arrangement for a synchronising mechanism in a motor vehicle gear box which makes possible simplified manufacture of the synchronising hub in particular, but which also makes it possible to manufacture the synchronising sleeve relatively simply and cheaply.

According to the invention such a synchronising arrangement is characterised in that the hub is formed with teeth which have a different tooth shaping in a lower and in an upper part of the tooth respectively, in that the tooth shaping in the upper tooth part is wider than an extension of the tooth shaping in the lower tooth part up to the maximum diameter of the hub, in that the tooth shaping in the upper parts of the teeth is able to fit into the grooves between the teeth on the sleeve, in that the lower parts of the teeth have a greater axial length than the upper parts of the teeth, and in that the teeth on the sleeve co-act, when torque is transmitted, with the lower parts of the teeth on the hub so that, a tooth flank in the upper part of the teeth occupies a position outside the profile of the tooth grooves on the sleeve and thereby prevents axial displacement of the sleeve into engagement with the upper tooth parts of the hub.

An arrangement according to the invention will act as an effective block to prevent involuntary disengagement of an engaged gear. Since the blocking force is produced by direct contact between a large number of teeth on the hub and the sleeve, stress arising from this contact will be relatively small. Stress arising from the transmission of torque depends on the length of the hub teeth which are not provided with an upper tooth part. With the arrangement according to the invention, it is possible by an appropriate choice of the said tooth length to obtain contact faces which, together, transmit all the power between the hub and the sleeve and are adequate from the point of view of stress.

The main advantage of the synchronising arrangement according to the invention, however, is that it enables simple and economical manufacture of the hub and the sleeve. The fact that all the teeth on the hub or on the sleeve respectively have the same width means that an uncomplicated, quick and therefore economical tooth milling operation can be used to form these teeth. Shortening of the teeth in the upper part of the hub to the desired length is easily achieved by a simple turning operation and therefore no milling operations are required for obtaining the short hub teeth.

Figure 2:
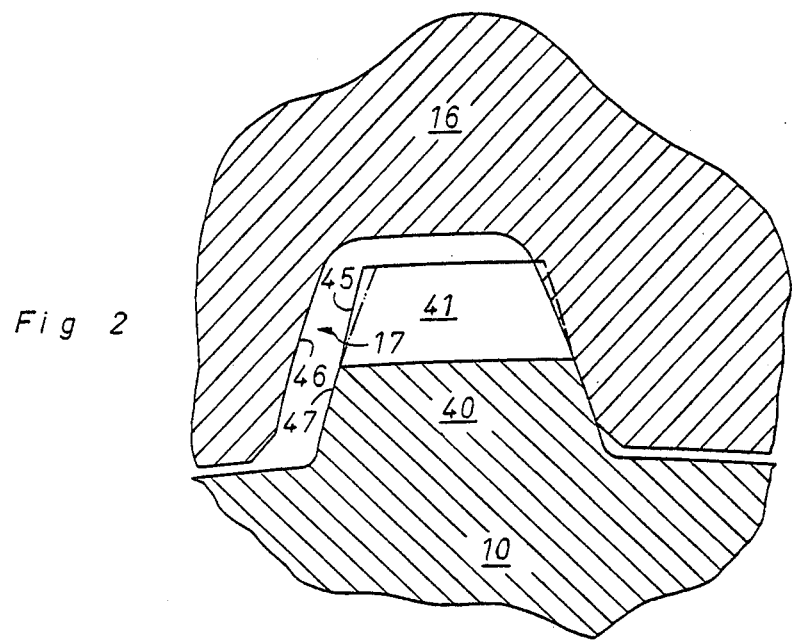
Figure 3:
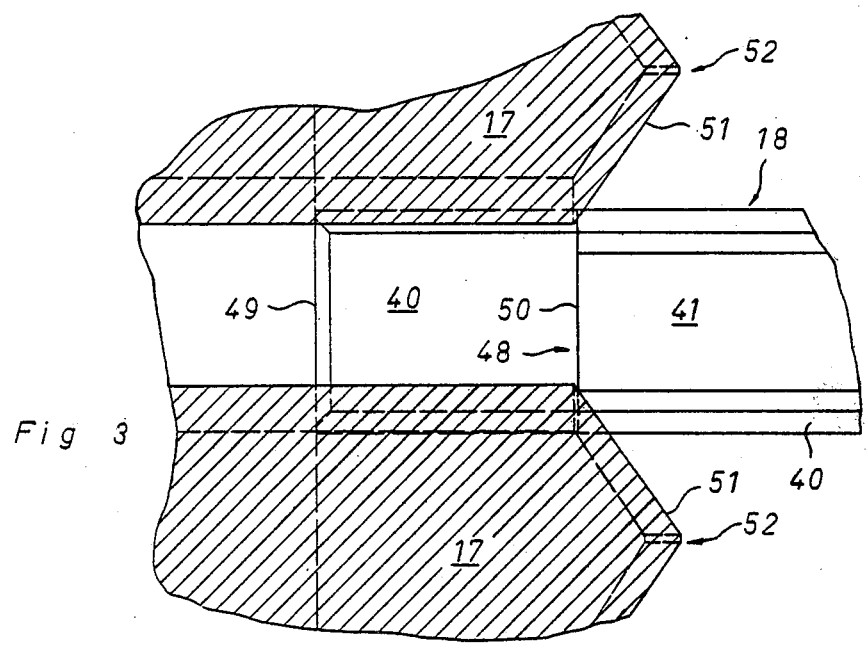

The above and other characteristic features of the invention will now be described in detail in the following description of one embodiment of a synchronising arrangement according to the invention, taken in conjunction with the accompanying drawings in which:

FIG. 1 is a longitudinal section through the upper half of the synchronising arrangement in the state when a gear is engaged in the gear box, FIG. 2 is a section along the line II—II in FIG. 1, showing the teeth meshing between the hub and the sleeve, with a gear engaged, and FIG. 3 is a section along the line III—III in FIG. 1 also showing the teeth meshing between the hub and the sleeve, with a gear engaged.

The synchronising arrangement 1 shown in FIG. 1 is for a motor vehicle gear box of known basic construction. A shaft 2 forms the main shaft of the gear box and is also its output shaft, this shaft 2 transmitting torque to the vehicle wheels via an end gear and drive shafts (not shown). On the shaft 2 are rotatably mounted a wheel 3 via a roller bearing 5 and a wheel 4 via a journal bearing 6. The wheels 3, 4 have external teeth 7, 8 which are designed to engage in pinions (not shown) on an intermediate shaft (not shown) located in the gear box. In a known way, the intermediate shaft has a torque-transmitting connection with the vehicle motor via a pinion on the input shaft of the gear box and a main coupling (not shown) disposed between the said shaft and the motor. By a manual action, the main coupling can connect up or disconnect said torque-transmitting connection, with the object of making it possible to change gear in the gear box. In the present case, the wheel 3 shown in FIG. 1 corresponds with the said input shaft, and the teeth 7 correspond with the pinion on the input shaft. The partly illustrated gear box also comprises a third and fourth gear (not shown) as in the standard type of 4-gear, gear box for cars.

Between the wheels 3 and 4 a hub 10 is located and rotationally fixed to the shaft 2 by means of a spline-type connection 11, formed by so-called "serrations". The axial position of the hub 10 on the shaft 2 is locked between a lock nut 12 or the like and a locationally-fixed journal bearing 13, the latter forming the mounting for the wheel 4. The wheels 3, 4 and the hub 10 can rotate at different speeds since they are separate from each other in the axial direction.

On the other side of the hub 10 the wheels 3, 4 are arranged so as each to co-act via a separate synchronising ring 20 with a sleeve 16 which can be displaced in the axial direction. For this purpose, each wheel 3, 4 is provided with additional external teeth 15 which are located axially between their external teeth 7, 8 co-acting with the intermediate shaft. The said external teeth 15 engage with the internal teeth 22 on the respective synchronising rings 20 and entrain them in rotation. The respective synchronising rings 20 are designed so that, in a position free of the sleeve 16, they are forced under the effect of a helical spring 25 against a stop ring 27 attached to the wheel 3 or 4. The helical spring 25 is disposed between the body of the synchronising ring 20 and a supporting ring 26 arranged locationally fixed in the wheel 3 or 4. Both the synchronising rings 20 are formed with a groove conical surface 31 which co-acts with an inner conical surface 30 in the respective ends of the sleeve 16. In a central axial position between the said conical surfaces 30, 31 the sleeve 16 is provided with internal teeth 17, which co-act with external teeth 18 on the hub 10. The axial displacement of the sleeve is effected by means of a changing fork 19 which can be manipulated from the driver's seat in the normal way via a gear changing mechanism (not shown).

The actual synchronising effect takes place in a known way when the sleeve 16 is pressed during the changing movement against a synchronising ring 20 between the sleeve 16 and the wheel 3, 4 concerned. The internal conical surface 30 of the sleeve 16 then presses on the grooved surface 31 on the ring 20 and, due to the friction effect thus created, either brakes or accelerates the wheel 3, 4 concerned to the rotary speed of the sleeve 16 and the hub 10 which is connected rotationally-fixed to the sleeve 16. The teeth 17 on the sleeve 16 thereafter engage with the teeth 15 on one or other of the wheels 3, 4 and thus effect the transmission of torque between the wheel in question and the hub 10.

In the synchronising arrangement shown in the Figures, all the teeth 18 on the hub 10 have the same shape tooth flanks consisting of two different tooth profiles 45, 47 in a lower and in an upper part 40, 41 of the tooth respectively. The tooth profile 45 in the upper part 41 of the tooth projects beyond an extension of the tooth profile 47 of the lower part 40 up to the maximum diameter of the hub 10, but is defined in such a way that the tooth shaping on the upper parts 41 is able to fit into the tooth grooves 46 on the sleeve 16 which co-acts with the hub 10. This makes it possible to effect the axial movement of the sleeve 16 relative to the hub 10, which is necessary when getting into gear, as is clearly shown in FIG. 1 by the half of the sleeve 16 drawn with a dashed line. The teeth flanks on the sleeve 16 and on the lower parts 40 on the hub 10 have the same involute profile (see FIG. 2). The tooth flanks on the upper parts 41 on the hub 10 have a different involute profile which, in accordance with the above, lies outside an imaginary continuation of the involute profile 47 of the lower parts 40 of the hub teeth. This can be clearly seen in FIG. 2, where the extension of the involute profile 47 of the lower part 40 is drawn in with a dashed line.

The lower tooth parts 40 on the hub 10 correspond advantageously to half the total height of the teeth, but since the contact surfaces between the hub and the sleeve are in linear contact, the lower parts of the teeth can, within the scope of the invention, be made between ¼ and ¾ of the total height of the teeth. If the lower part of the tooth is greater than half the total height of the tooth, it is advantageous, however, to make the upper part of the tooth with a wider tooth shape than that displayed by an involute.

The upper tooth parts 41 on the hub 10 have a shorter axial length than the lower tooth parts 40 on the hub. In FIGS. 1 and 3 a transverse transition 48 is shown between the upper and lower parts 41 and 40 respectively on the hub teeth, but the transitional section can also be formed alternatively either completely, or in part, as a chamfered surface sloping at an angle to the upper plane of the lower part of the teeth. The transition 48 is also located at a distance from the respective ends 49 of the hub teeth which advantageously exceeds the tooth height of the lower parts 40 of the hub teeth which are used during the transmission of torque.

The said spacing has an effect on the amount of stress to which the hub teeth 18 are subjected during the transmission of torque. In such a case, the sleeve 16 has moved axially from a neutral, disengaged position into a position where a gear is engaged. The last-named position is shown in FIG. 1, where the sleeve 16 (which is shown by full lines) is engaged with the inner ring of teeth 15 on the wheel 3. The teeth 17 on the sleeve 16 lie axially outside the upper part 41 of the hub teeth 18, and in this position the tooth flanks on the sleeve 16 rest against the flanks on the lower parts 40 of the teeth on the hub 10 and thereby effect the transmission of torque between the wheel 3 and the hub 10 via the sleeve 16.

FIGS. 2 and 3 show how an axially-extending end face 50 formed at the transition 48 between the upper and lower parts 41, 40 of a hub cog 18 overlaps to a certain extent by a sloping surface 51 facing towards it, followed by chamfered ends 52, on the teeth 17 on the sleeve 16. When axial forces arise during the transmission of torque which tend to return the sleeve 16 to its disengaged position, this is prevented due to the fact that the above-mentioned end faces 50, 51 press with direct contact on each other. Since this occurs via all the co-acting teeth on the hub 10 and the sleeve 16, an effective block is formed to prevent the sleeve 16 from being displaced in a neutral direction.

When disconnecting an engaged gear, the connection between the motor and the gear box is disconnected in the conventional way with a clutch pedal or the like, whereby the transmission of torque between the ring of teeth 15, the sleeve 16 and the hub 10 is interrupted. The gear is then disconnected by moving the sleeve 16 into its neutral position by exerting an external force. The end surface 50 of the transition on the hub 10 now guides the pointed end faces 51 on the teeth 17 on the sleeve 16 so that the respective teeth on the hub 10 can engage completely in the tooth grooves on the sleeve 16, after which the displacement movement can easily bring the sleeve 16 to the neutral position.

The synchronising hub 10 of the arrangement is advantageous from the manufacturing point of view, as mentioned above. Thus, by turning a gear-wheel material the hub 10 is provided with the central raised part 41, and, by a subsequent relatively simple milling operation, the double involute profiles of the hub teeth can be formed. The milling operation allows the machining of several hubs 10 at the same time.

I claim:

1. In a synchronising arrangement for a motor vehicle gear box including a shaft, an externally toothed hub locationally fixed in the axial direction on the said shaft, and an internally toothed synchronising sleeve which is: (1) concentric with said shaft, and (2) axially displaceable relative to said shaft, the improvement comprising said external teeth on said hub having a different tooth shaping in a lower and in an upper part of the tooth respectively, said hub tooth shaping in said upper part being wider than an extension of said hub tooth shaping in said lower part up to the maximum diameter of said hub, said tooth shaping in said upper part being such as to enable said hub teeth to fit into the grooves between the teeth on said hub sleeve, said hub tooth upper part having a smaller axial length than said lower part and a tooth flank in the transition between said lower and upper parts, said hub teeth lower parts coacting with said sleeve teeth and said tooth flanks of said hub teeth upper parts occupying a position outside the profile of the tooth grooves on said sleeve, whereby to prevent axial displacement of said sleeve into engagement with said hub teeth upper parts, when said sleeve is axially displaced in relation to said hub and torque is transmitted.

2. In a synchronising arrangement according to claim 1, the improvement wherein said hub teeth lower tooth parts have the same tooth profile as the teeth on said sleeve.

3. In a synchronising arrangement according to claim 2, the improvement wherein said tooth profile has an involute shape.

4. In a synchronising arrangement according to claim 1 or claim 3, the improvement wherein said hub teeth upper tooth parts have an involute tooth profile.

5. In a synchronising arrangement according to claim 1, the improvement wherein all of said hub teeth have the same shape.

6. In a synchronising arrangement according to claim 1, 2, 3, or 5, the improvement wherein said hub teeth lower tooth parts are dimensioned in the radial direction to approximately half the total height of said teeth.

7. In a synchronising arrangement according to claim 5, the improvement wherein the transition portion between said hub teeth lower and upper tooth parts has generally transverse end faces.

8. In a synchronising arrangement according to claim 7, the improvement wherein the transition portion between the said hub teeth lower and upper tooth parts is located a distance from the end of the said teeth which distance is greater than the radial height of the lower tooth part.

* * * * *